Patented Oct. 13, 1925.

1,557,132

UNITED STATES PATENT OFFICE.

PERCY A. E. ARMSTRONG, OF LOUDONVILLE, NEW YORK, ASSIGNOR TO LUDLUM STEEL COMPANY, OF WATERVLIET, NEW YORK, A CORPORATION OF NEW JERSEY.

PROCESS AND PRODUCT OF MAKING LOW-CARBON CHROMIUM-IRON ALLOYS.

No Drawing.   Application filed November 17, 1923.   Serial No. 675,306.

*To all whom it may concern:*

Be it known that I, PERCY A. E. ARMSTRONG, a subject of the King of Great Britain, and a resident of Loudonville, county of Albany, and State of New York, have invented a new and useful Improvement in Processes and Products of Making Low-Carbon Chromium-Iron Alloys, of which the following is a specification.

My invention relates to a process and product of making low carbon chromium iron alloys.

Where chromium and iron are placed in a furnace and melted together in the ordinary way, the melting operation consuming a period of several hours, it is practically impossible so far as I am aware to obtain a product which is really low in carbon, no matter how low in carbon the iron and chromium or ferrochrome taken for melting may be. With alloys containing over about 7% chromium, it is difficult and often impossible by such ordinary melting practice to get the carbon content as low as carbon 0.10%, and in order to obtain carbon content even approximately as low as this, extremely expensive materials must be used.

This is due to the high avidity of the combination of molten chromium and iron for carbon, which is taken up thereby from any and every available source, including furnace electrodes, linings, slags, atmospheric and furnace gases, etc.

The situation is substantially the same when the chomium addition is made by introducing ferrochrome in the cold after the iron is melted or partially melted, since such practice involves the further application of heat for an extended period before the whole melt is completed.

Chromium and iron when melted together produce a slag containing a considerable proportion of chromium oxide. This slag is of high reflecting or mirror-like surface, and when the melting is carried on in an open hearth furnace rapid deterioration of the furnace roof and sides is caused by long continued reflection of heat from such slag.

I have found that these and related objections can be avoided by reducing to substantially a minimum the time in which the chromium is in the molten state, and, therefore, subject to carbonization and oxidation. My preferred mode of securing this result is by melting low carbon iron, preheating the chomium addition and introducing same into the molten iron prior to teeming or casting into ingots.

Commercially pure chromium and ferrochromium can be heated up to quite high temperatures below their melting point without any considerable tendency to carbonization or oxidation.

The production of molten iron with very low carbon is well understood and requires no particular explanation, production of iron with carbon as low as .01% and even lower being a matter of everyday procedure in commercial iron and steel manufacture. The melting of the iron can be carried on in any furnace, electric, open hearth, Bessemer converter or any other apparatus capable of producing low carbon iron in molten state.

The molten iron is "killed" or deoxidized before the chromium addition is made, as by introduction of aluminum in bar form beneath the surface.

When the temperature of the iron bath has been carried well above its melting point, the melting of the chromium addition can be completed almost instantaneously or at least in a very short time, the excess heat of the iron bath being utilized to complete the melting of the chromium addition. All long time period exposure of chromium to oxidation and taking up of carbon is thus avoided, the melting operation being complete and the whole melt being ready to pour within a few minutes after the chromium addition has been made.

When the melting is carried on in an open hearth furnace, the period of time in which the slag may be highly reflecting in character is so short as to substantially avoid any injury to the roof and walls.

Chromium iron alloys made in the manner described may be produced without the necessity of making analyses of the melt after the chromium has been added, it being readily possible to keep the alloy content of the finished product within a very few points of the calculated proportions.

While the chromium addition is preferably made in the furnace, it may be made in the ladle, as, for example, with Bessemer iron. In the case of making the hot chromium addition in the ladle, after making such addition I preferably add a few shovels full of lead oxide or litharge, on top of the slag in the ladle. This results in the liberation of a considerable amount of heat, the chemical reaction involved apparently including a throwing down of chromium which may exist in combination in the slag, so that it goes back into the melt in metallic form. While such addition of litharage is particularly advantageous when the chromium addition is made in the ladle in order to have a suitably high pouring temperature and avoid undue loss of heat, the addition of litharge may be made in the furnace in case the hot addition of chromium is made in the furnace. Such part of the lead oxide as is reduced to metallic lead apparently does not alloy with the other materials, but sinks to the bottom of the ladle or furnace and is usually found in the bottom of the first ingot poured.

By my improved process relatively cheap ferrochrome having comparatively high carbon can be made use of with a great saving and advantage in the manufacture of chromium steels with relatively low carbon. Where very low carbon, say carbon below .05% is required, the present process carried out with substantially carbon free chromium, so far as my experience goes, affords substantially the only way of producing it.

In general the process may be used to distinct advantage where the desired carbon content is less than one-twentieth of the chromium content and also less than the maximum of .5%, but as stated its greatest utility is in the production of very low carbon alloys of iron and chromium.

The temperature to which the chromium addition material is heated will, of course, depend upon the proportion of added materials, etc., but so long as it is sufficiently heated so that it becomes molten in a relatively short time after being introduced into the iron bath, the advantages of my invention can be secured. The fact that at least the final part of the chromium melting must be done after the chromium addition has been made, of course, limits to some extent the percentages of chromium which may be added in this way, but it is practical when the iron of the ferrochrome is very low or when practically pure chromium is used and the preheating is carried up close to the melting point of the preheated material to obtain alloys having as high as 30% of chromium.

The process, of course, is not confined to the manufacture of straight chromium iron alloys, but may be made use of in the production of various alloys, where the chromium content is high, as, for example, chromium-iron-silicon alloys, chromium-iron-nickel alloys, chromium-iron-molybdenum alloys, and chromium iron alloys with additions of tungsten, vanadium, titanium, zirconium, etc., or combinations of the foregoing.

I claim:

1. In the process of making low carbon or substantially carbon free alloys of iron and chromium, the step of melting iron, preheating chromium to a temperature approaching toward but below its melting point, and introducing it into the molten iron.

2. In the process of making low carbon or substantially carbon free alloys of iron and chromium, the step of melting iron, preheating chromium containing material to a temperature approaching toward but below its melting point, and introducing it into the molten iron.

3. In the process of making alloys of iron and chromium the steps of melting the iron, preheating the chromium addition to a temperature below its melting point, introducing the preheated material into the iron, and adding lead oxide.

4. In the process of making alloys of iron and chromium, the steps of preheating chromium addition material and adding it to molten iron in a ladle, and maintaining the temperature in the ladle by addition of lead oxide.

5. In the process of making alloys of iron and chromium low in carbon, the steps of melting low carbon iron, deoxidizing same with aluminum, and introducing therein chromium containing material of low carbon in preheated state, but not molten.

6. In the process of making alloys of iron and chromium low in carbon, the steps of melting low carbon iron, deoxidizing same with aluminum, introducing therein chromium containing material of low carbon in preheated state, but not molten, and adding lead oxide.

7. In the process of making alloys of iron and chromium having chromium over 7%, the steps of melting iron to practically carbon free molten form, preheating to a temperature approaching toward but below its melting point material containing chromium over 7% and carbon under .5% and also under one-twentieth of the chromium content, and adding same in heated state to the molten iron.

8. In the process of making practically carbon free alloys of iron and chromium, the step of adding to practically carbon free molten iron practically carbon free chromium preheated to a temperature approaching toward but below its melting point.

9. In the process of making practically carbon free alloys of iron and chromium, the steps of deoxidizing practically carbon free molten iron with aluminum, and adding to the deoxidized iron preheated practically carbon free chromium.

10. In the process of making low carbon alloys of iron and chromium, the steps of bringing molten low carbon iron to a temperature considerably above the melting point, and introducing therein chromium containing material preheated to a temperature approaching its melting point but not molten when introduced, utilizing the excess heat of the iron to complete the melting of the chromium addition, and casting the melt into ingots.

11. Alloy of iron and chromium having chromium over 7% and carbon below .05% made by introduction of preheated to a temperature approaching its melting point— but not molten—chromium substantially free of carbon into substantially carbon free molten iron.

12. Alloy of iron and chromium having chromium from about 7% to about 30%, and having carbon under a maximum of .5%, and also under one-twentieth of the chromium content, made by introduction of chromium addition material preheated to a temperature approaching its melting point but not molten into substantially carbon free molten iron.

In testimony whereof, I have signed my name hereto.

PERCY A. E. ARMSTRONG.